(12) United States Patent
Springfield et al.

(10) Patent No.: US 8,340,954 B2
(45) Date of Patent: Dec. 25, 2012

(54) MULTI-LANGUAGE SUPPORT IN PREBOOT ENVIRONMENT

(75) Inventors: Randall S. Springfield, Chapel Hill, NC (US); Jeffrey M. Estroff, Cary, NC (US); Mikio Hagiwara, Machida (JP); James P. Hoff, Raleigh, NC (US); Seiichi Kawano, Kanagawa (JP); Noritoshi Yoshiyama, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1151 days.

(21) Appl. No.: 12/202,311

(22) Filed: Aug. 31, 2008

(65) Prior Publication Data
US 2010/0057440 A1    Mar. 4, 2010

(51) Int. Cl.
*G06F 17/28* (2006.01)

(52) U.S. Cl. .......... 704/4; 704/2; 704/270; 713/1; 713/2; 717/177

(58) Field of Classification Search .......... 704/2–4, 704/270; 713/1, 2; 717/177
See application file for complete search history.

(56) References Cited

OTHER PUBLICATIONS

IBM "A Method of Central Managed Secure Client PC" Jul. 12, 2006 04:18 www.IP.com prior art database id#: IPCOM000138248D.

*Primary Examiner* — Justin Rider
(74) *Attorney, Agent, or Firm* — Ference & Associates LLC (57) ABSTRACT

Systems and methods for providing multi-language support in a pre-boot environment are supplied. User interface type information, such as keyboard type information and translation tables, are ascertained and provided to the pre-boot environment of the apparatus, allowing the apparatus to properly receive and/or translate multi-language inputs in an appropriate fashion.

18 Claims, 6 Drawing Sheets

KEYBOARD TYPE 1

| 1 | 2 | 3 | 4 | 5 | 6 | 7 | 8 | 9 | 0 |
|---|---|---|---|---|---|---|---|---|---|
| A | (Z) | E | R | T | Y | U | I | O | P |
| Q | S | D | F | G | H | J | K | L | M |
| W | X | C | V | B | N | | | | |

KEYBOARD TYPE 2

| 1 | 2 | 3 | 4 | 5 | 6 | 7 | 8 | 9 | 0 |
|---|---|---|---|---|---|---|---|---|---|
| Q | W | E | R | T | (Z) | U | I | O | P |
| A | S | D | F | G | H | J | K | L | |
| Y | X | C | V | B | N | M | | | |

KEYBOARD TYPE 3

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | |
| (Z) | X | C | V | B | N | M | | | |

MULTI-LANGUAGE SUPPORT IN PREBOOT ENVIRONMENT

FIELD OF THE INVENTION

The present invention relates to multi-language support in a pre-boot environment and problems associated therewith, and methods, arrangements and modules for addressing such problems.

BACKGROUND OF THE INVENTION

Keyboards come in a variety of types or formats (e.g., keyboards of different languages have different keys at the same key position on the keyboard template). The nature of keyboard operation makes such keyboard variability problematic. This arises from the fact that when one presses a key on a keyboard, the keyboard is not sending to the OS (Operating System) the character (e.g., ASCII (American Standard Code for Information Interchange)) representation of what was pressed. Instead, the keyboard itself is sending Scan Code to the OS, which can be one or more bytes, and represents a location on the keyboard. It does not necessarily represent the character equivalent (e.g., ASCII).

For example, if one presses the letter "Z" on a US keyboard (located on the lower left portion of the keyboard), or on a French keyboard or on a German keyboard, these keys are located at different places on each keyboard. Thus, when one presses that letter "Z" on those three keyboard types, one actually gets three different Scan Codes. The keyboard architecture itself does not indicate what type of keyboard it is (e.g. English, French, German, etc.). This variability in actual keys at a particular positions (e.g. "Z" located at different positions on different keyboards) gives rise to various problems (for example, there is no standardized way to handle these differences at the pre-boot level, discussed below).

In a pre-boot environment (i.e. a stage where the OS has not yet booted) there is no formal way to handle the multiple languages possible through the keyboard and display device. As stated, POST/BIOS ("Power-on Self-test"/"Basic Input/Output System") handles key-inputs as Scan Code, independent from the ASCII/uni-code. This comes from the PS/2 architecture to achieve flexibility to support multiple languages only in the OS environment and in order to make the Personal Computer (PC) hardware simpler. The numbers 0-9 and beeps for user interface are utilized. For example, two beeps show a POST error with a number (e.g. "163" shows CMOS checksum error). By default, English (United States) is set in POST/BIOS. There is no formal way to inform a keyboard type (e.g. ASCII). Normally, the OS equates a Scan Code with key characters (i.e. the OS translates the keys using some type of mapping).

Currently in the BIOS environment, when one presses a key, the BIOS has no indication of what character was pressed, merely the location of the pressed key. In other words, the BIOS simply ascertains the location of the key that was pressed based on the given Scan Code. For instance, when one types a password, BIOS cannot discern whether "A" or "B" or "C", etc., was pressed; it is only discernable that a particular location was pressed (through the corresponding Scan Code). This is why BIOS passwords are normally lower case and restricted, because this area of the keyboard is normally standardized for characters (e.g. shift key for upper case is not acceptable because that key can move around to different locations in different types of keyboards). For example, BIOS passwords are commonly restricted to alphanumeric keys only. Thus, some passwords acceptable under the OS environment are unacceptable in the pre-boot environment. Thus, in BIOS, only the location of the particular key is indicated by the Scan Code, not the actual key occupying that position and this leads to restrictions on what may be available keys for BIOS passwords—they are restricted to constant keys. This in turn leads to password variability difficulties (e.g. a user's OS password may be unacceptable in the pre-boot environment, necessitating creation and memorization of multiple passwords).

Pre-boot is becoming a more critical environment for client PC manageability, as it is secure enough to handle vital data and has the rich networking capability for secret exchanges made in a secure way. Intel iAMT is one such example. Therefore, some level of user interface is required until rich GUI (Graphical User Interface) is available by booting the normal OS or small specific purpose OS with consistent keyboard and character display.

Less preferable methods not implemented which attempt to handle such problems include the following. One may install multiple character sets in the system non-volatile random access memory (NVRAM) and have a user choose the appropriate language. For example, one of the THINKCENTRE series of computers sold by Lenovo (US) Inc. of Morrisville, N.C., may have multiple pre-installed languages in BIOS-FLASH ROM (Flash Erasable Programmable Read-Only Memory), whereby the user chooses the appropriate language. However, the number of languages will be limited based upon storage size and must be chosen manually. Moreover, it can be burdensome to ask a user what kind of keyboard is being used. One may also boot a small OS supporting multiple languages. The planar (motherboard) in this context would need to have storage space for this OS or a method would be required to download this OS image from a HDD (Hard disk), CD-ROM (Compact Disk-Read Only Memory), or a network. Moreover, this would require a capability to prepare the OS images for each language, or the capability to support multiple language within single OS image.

Therefore, a need has arisen in connection with the above-described shortcomings in order to provide multi-language support in a pre-boot environment and solve the various problems associated therewith.

SUMMARY OF THE INVENTION

Broadly contemplated herein, in accordance with at least one presently preferred embodiment of the present invention, are new methods, arrangements and systems for addressing the problem of providing multi-language support in a pre-boot environment.

In summary, one aspect of the present invention provides a method comprising: ascertaining user interface translation information; and providing the information to an apparatus so as to be accessible during a pre-boot operating stage of the apparatus.

Another aspect of the invention provides a system comprising: a processor; and a memory storing code accessible by the processor to: ascertain translation information corresponding to a user interface of the apparatus; and provide the information to the apparatus so as to be accessible during a pre-boot operating stage of the apparatus.

Another aspect of the invention provides a program storage device readable by machine, tangibly embodying a program of instructions executable by the machine to perform acts, said acts comprising: ascertaining user interface translation

DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, arrangements, modules and methods of the present invention, as represented in the Figures, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, hardware modules, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

The description of the invention will proceed with a higher level description of the present invention and conclude with a more detailed description of preferred embodiments with reference to the figures.

There is broadly contemplated herein, in accordance with at least one presently preferred embodiment of the present invention, methods and arrangements for addressing the problem of providing multi-language support in a pre-boot environment. Thus, among other advantages, the client is enabled with, at the server level, the freedom of generating passwords in a standardized, readable format. The server generates passwords (e.g. in ASCII format) and installs them on the client machine (e.g. a PC). Thereafter, in order for the BIOS to correctly map the particular keyboard being utilized to the correct ASCII codes, it must obtain the mapping information. This may be achieved in various ways at least including having the OS boot, at least one time, and inform the BIOS. The OS is able to determine what keyboard type or what country and what keyboard settings are appropriate based upon the user preferences. Therefore, when the OS (e.g. WINDOWS) boots the first time, it detects what the language, country settings, region settings, keyboard type, etc, and starts a corresponding keyboard mapping table, making it available to the BIOS upon a subsequent boot. One way to achieve this is by using an SMI call, which essentially informs the BIOS what this particular user keyboard mapping should be (i.e. the proper table) based on the user's country settings (i.e. by storing data in an area accessible to BIOS in the pre-boot phase). Alternatively, in manufacturing, if the keyboard type is known, essentially the same may be accomplished (i.e. informing the BIOS of the map) at the time of manufacture.

Figure 1:
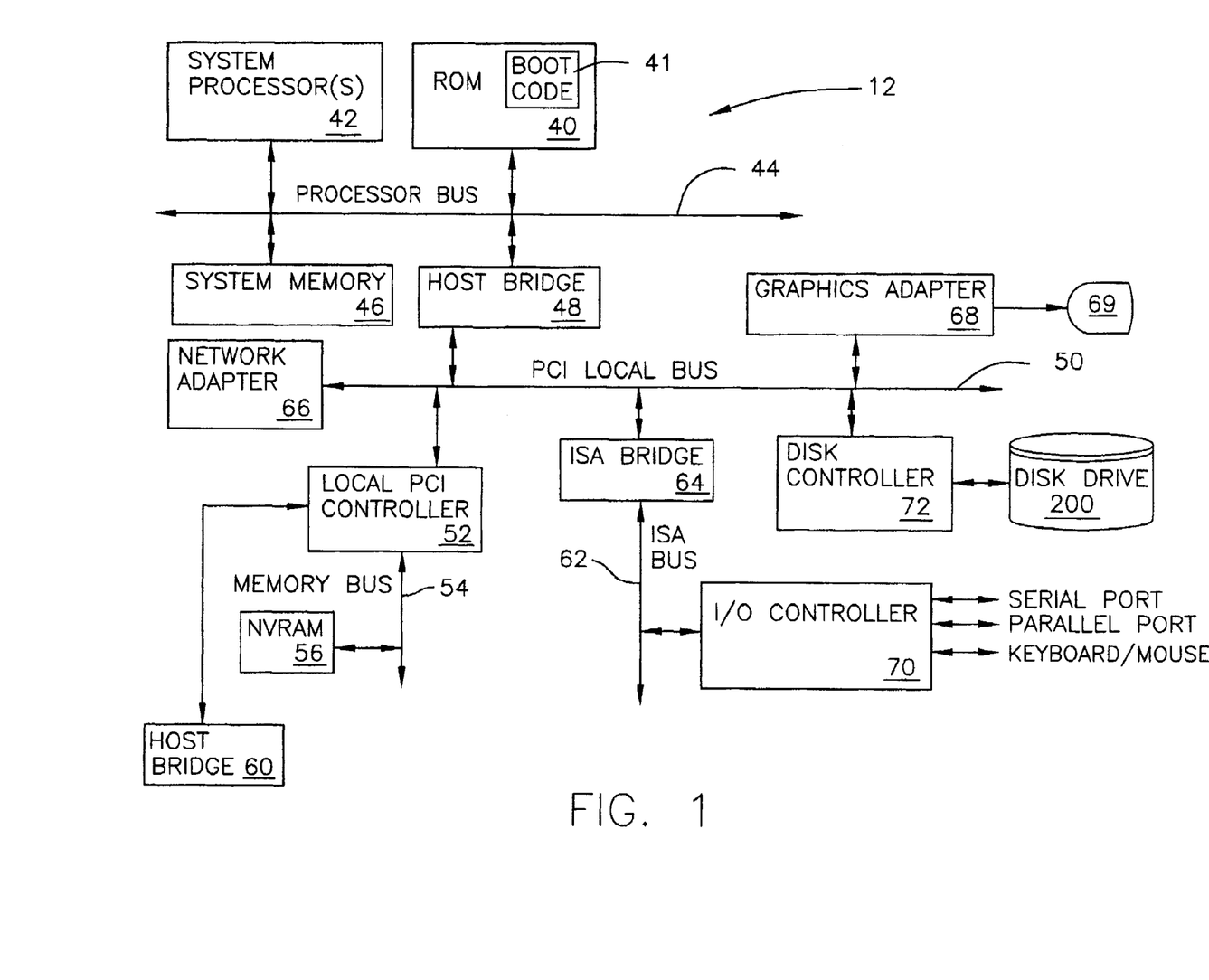
FIG. 1 is a block diagram of a computer system according to a preferred embodiment of the present invention.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C. or a workstation computer, such as the Intellistation®, which are sold by International Business Machines (IBM) Corporation of Armonk, N.Y.; however, as will become apparent from the following description, the present invention is applicable to multi-language support in a pre-boot environment in any data processing system.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard, mouse, and a disk drive. In addition, I/O controller 70 supports external communication by computer system 12 via serial and parallel ports.

Figure 2:
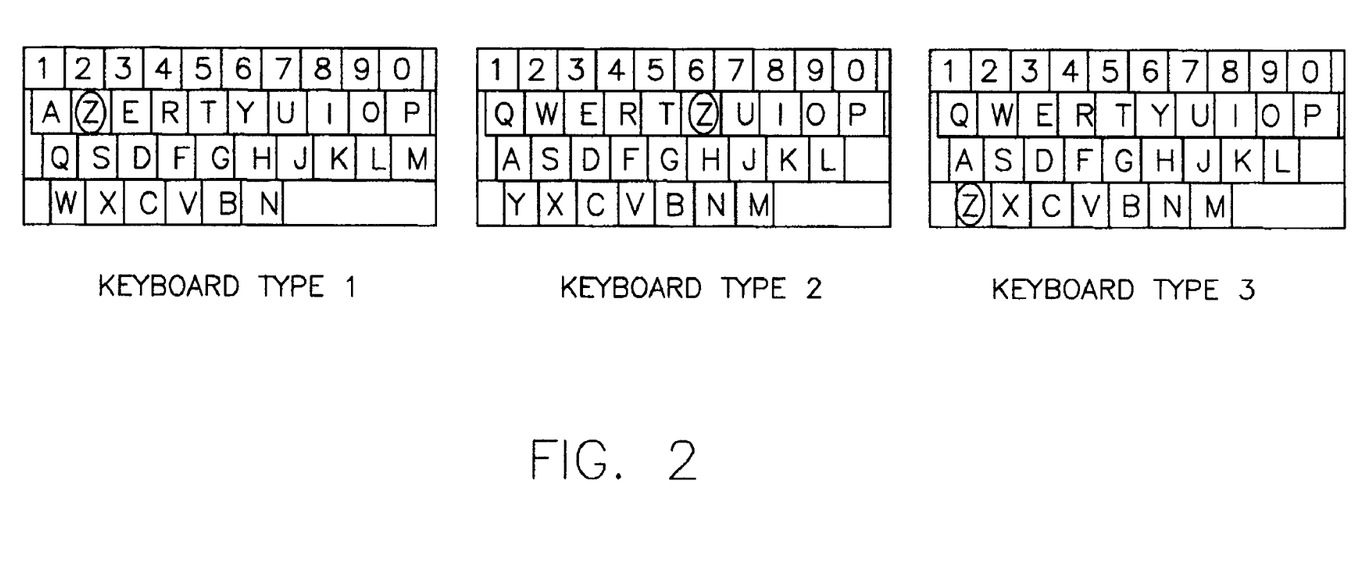
FIG. 2 is a schematic illustration of keyboard types.

Referring now to FIG. 2, user interfaces (e.g. keyboards) come in a variety of types. These types include keys with the same printed character appearing at different locations on the keyboards. For example, the Letter "Z" is located at different places on different types of keyboards (e.g. English, German or French). Currently in the BIOS environment, when one presses a key (e.g. "Z"), the BIOS has no indication of what character was pressed, merely the location of the pressed key. In other words, the BIOS simply ascertains the location of the key that was pressed based on the given Scan Code. For instance, when one types a password including the letter "Z" on each of the three types of keyboards depicted, the BIOS discerns not whether "Z" was pressed; it is only discernable that a particular location was pressed (through the corresponding Scan Code). This is why BIOS passwords are normally lower case and restricted, because this area of the keyboard is normally standardized for characters. This in turn leads to difficulties in coordinating BIOS passwords and OS passwords.

Figure 3:
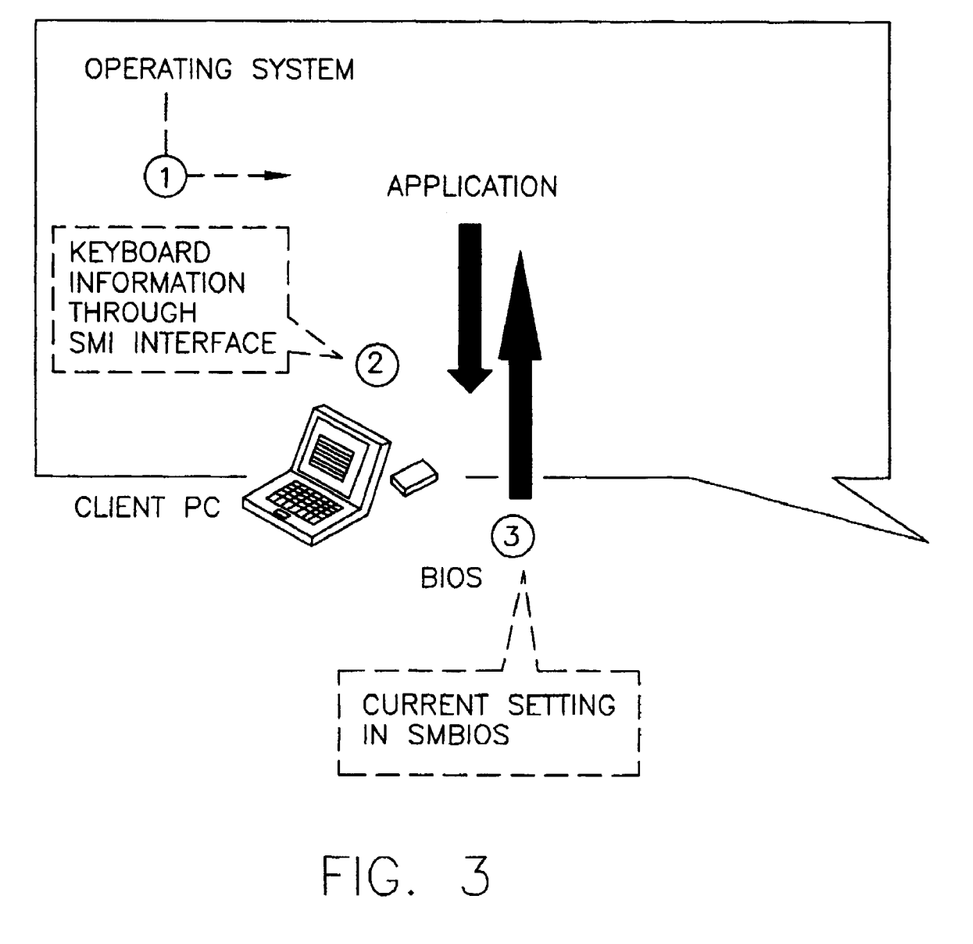
FIG. 3 is a schematic illustration of providing multi-language support to a pre-boot environment of an apparatus via an operating system application.

Referring now to FIG. 3, according to an embodiment of the present invention, upon booting the OS initially, an application executes an OS API (Application Program Interface) and obtains the keyboard information from the OS. The application then makes available the particular keyboard information necessary (obtained from the OS) to the BIOS. This may be accomplished via an SMI (system management interface) call, wherein the keyboard data is stored in an accessible memory, such as NV-RAM on the planar. The SMI calls BIOS and BIOS puts the keyboard data in a particular location. In this context, the OS is up and running and the application wants to communicate with pre-boot, so instead of calling BIOS directly, a software SMI call is performed, passing data to the SMI handler. The system stalls and starts running in real mode in the SMI handler, taking inputs passed to it as appropriate. Thus, on a per platform basis, engineers may make a conscious decision as to which location the keyboard information is stored, as appropriate.

The keyboard information could be stored in various different places; however, a preferred implementation is in flash. As the keyboard information is relatively small (128 bytes) it could alternatively be placed in a different location. Therefore, the keyboard information is made accessible to the BIOS upon subsequent boot. The BIOS refers to this information for translation upon detection of keyboard input (e.g. user password input or remotely provided data). For example, the BIOS may utilize this information for converting Scan Code to ASCII. Upon a subsequent boot, the current setting of keyboard information in the SMBIOS (System Management BIOS) is shown to the application running in the OS to determine if the setting is appropriate. The application is able to locate the keyboard information (i.e. it is engineered into the SMBIOS specification controlled by the DMTF (Desktop Management Task Force)).

In a CMP (centralized managed password) context, where a server is generating the passwords for a user, having multi-language support can be advantageous. Some helpful background information on CMP login may be found in the publication, "A Method of Secure Managed Secure Client PC," at the IP.com Prior Art Database (www.ip.com), IP.com number IPCOM000138248D; this publication is hereby fully incorporated by reference as if set forth in its entirety herein. In this context, it is not a viable solution to generate Scan Codes. For example, if a user lost his or her password and wanted to call it through a server, the administrator at the server would want to be able to ascertain, for example, "your keyboard is 123Z." However, the only way this could be possible is if the pre-boot (BIOS) was capable of equating the letter "Z" to a certain Scan Code. If not, it is impractical because there is no practical way to correlate Scan Codes to what the administrator at the server is reading. In other words, one cannot tell the user that a keyboard is, for example, German or English based upon the information available at the server. So what is needed is a method in which, at the server, the administrator could generate a password in a readable format, for example in ASCII. The methodology implicating the pre-boot support could therefore effectively convert keys to Scan Codes.

Figure 4:
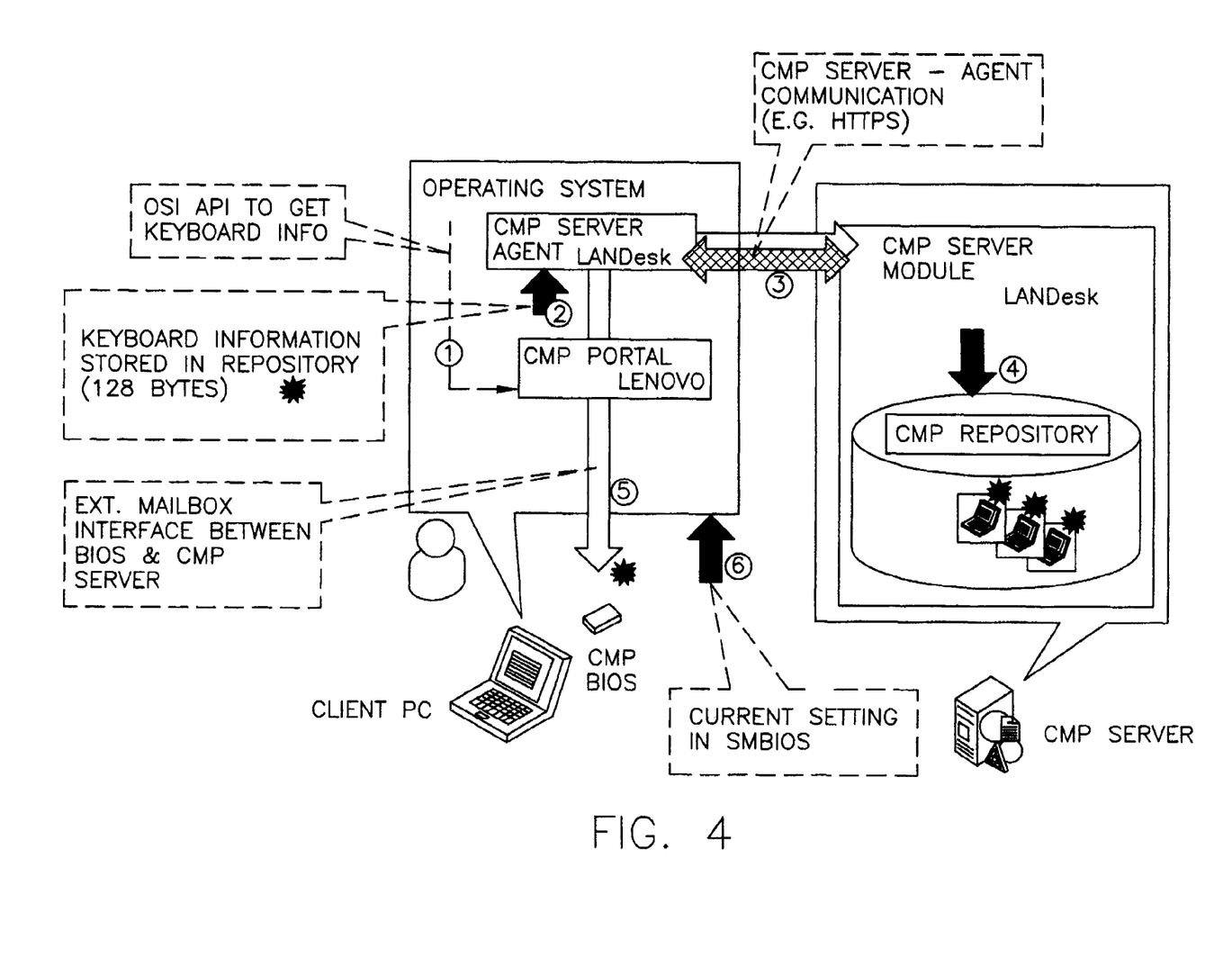
FIG. 4 is a schematic illustration of providing multi-language support in a CMP environment.

Referring now to FIG. 4, according to an embodiment of the present invention, a client application, when booting to an OS, will capture the mapping table information of the particular system and send it to a server. The server will store what the keyboard settings and mappings are for that system. When the server is thereafter generating random passwords for that system in CMP, it is actually utilizing/storing the true scan codes (e.g. the server does a mapping of the ASCII password to the true Scan Codes for that particular system). This is what is sent down to the client from the server (i.e. it is the true mapping of password to Scan Codes, so that the BIOS does not have to do any translation). In other words, the BIOS actually has the real Scan Codes stored as the passwords. Thus, instead of necessitating the BIOS to perform the translation itself, the translation is accomplished remotely (e.g. at a server) prior to passing the data to the BIOS.

Figure 5:
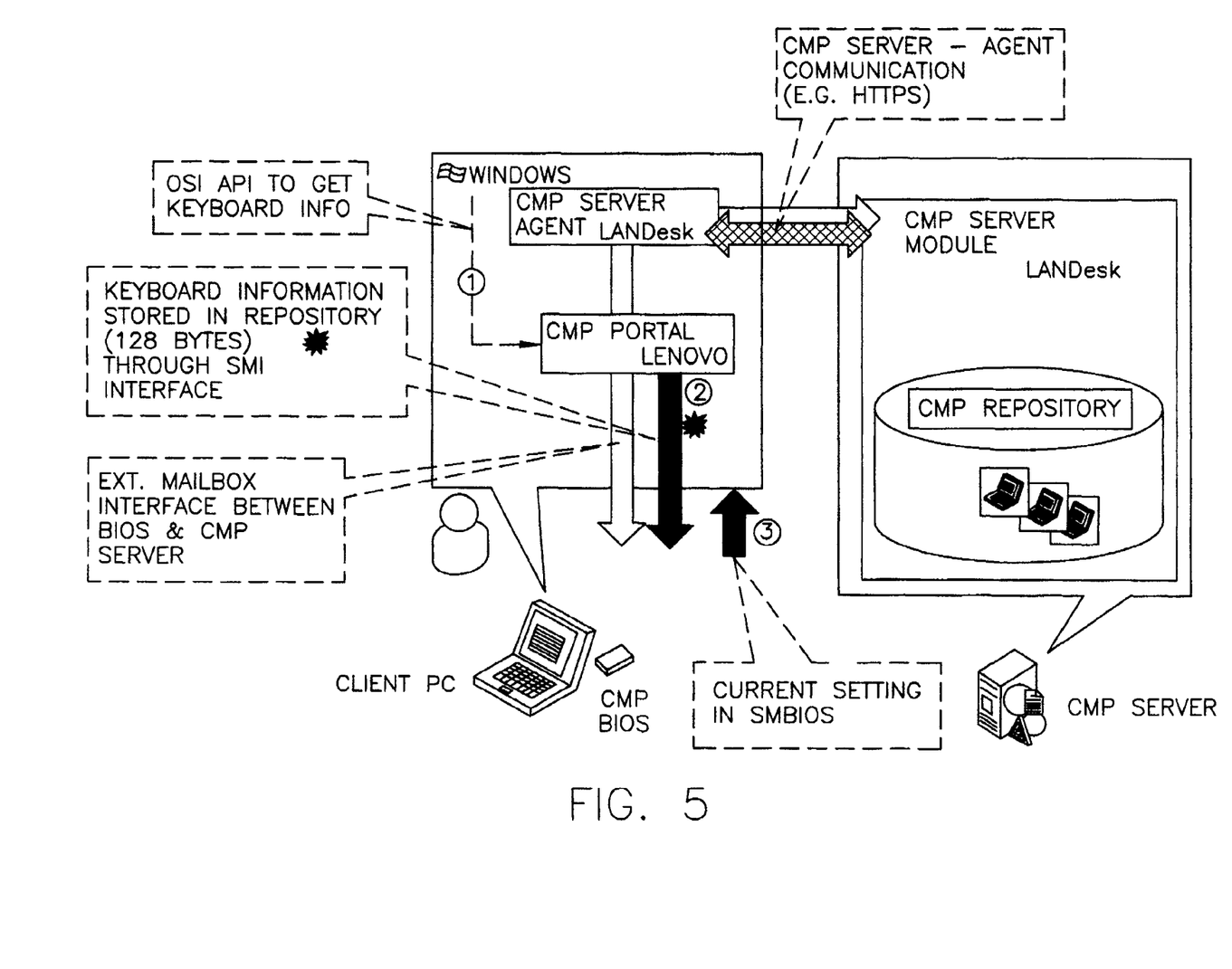
FIG. 5 is a schematic illustration of providing multi-language support in a CMP environment wherein translation does not occur at the BIOS.

Referring now to FIG. 5, according to an embodiment of the present invention, in the CMP context, the server generates the passwords in a particular format (e.g. ASCII format), sends down to the BIOS, in this particular format, the passwords, and the server/agent also passes down the mapping table. Therefore, the BIOS has the passwords in ASCII format and the BIOS has the appropriate mapping table of Scan Codes (e.g. to ASCII). Thus, the BIOS has obtained everything necessary to perform the translations. If the user subsequently wants to type his or her own password, the BIOS is enabled to translate it to ASCII and therefore the password would work correctly.

Figure 6:
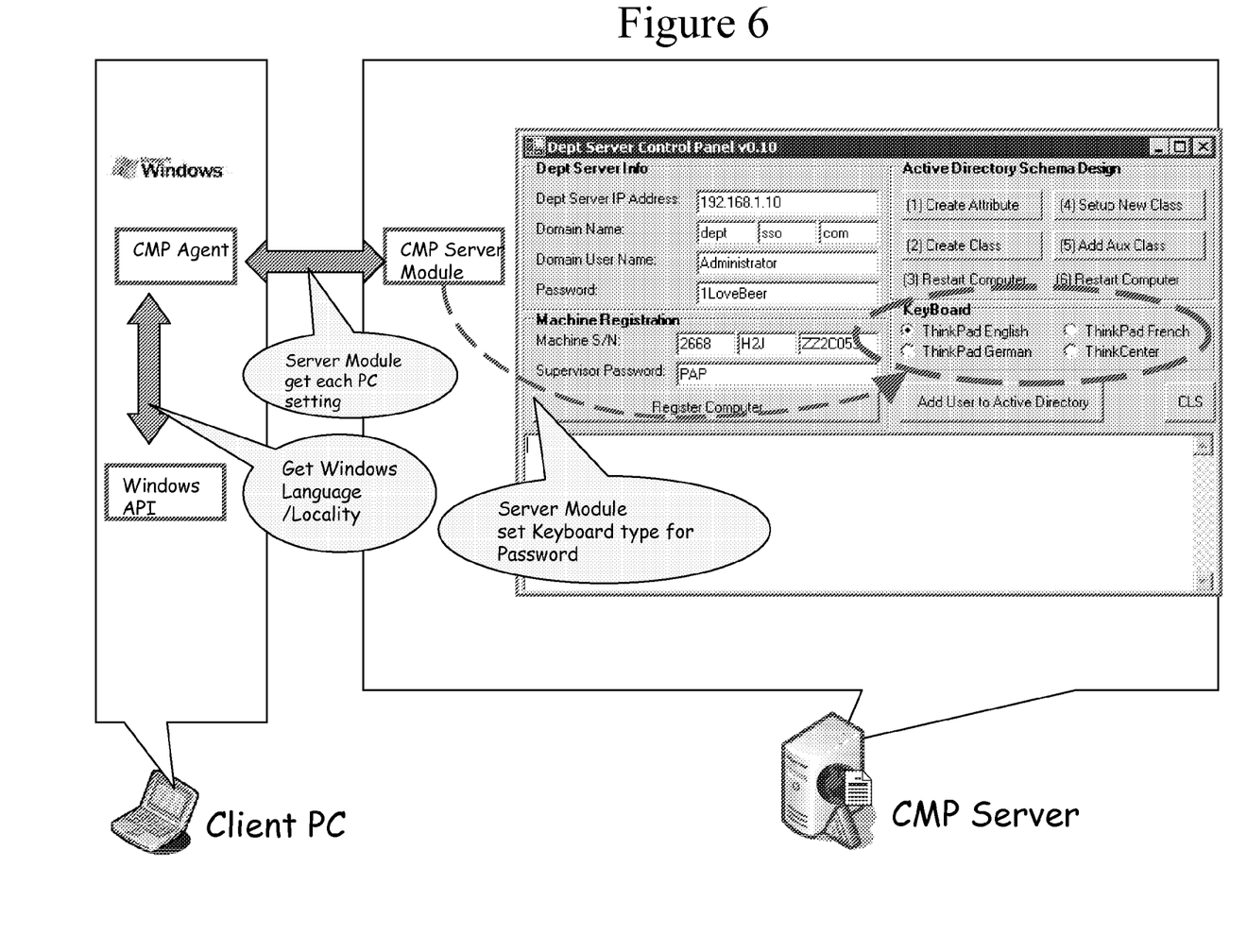
FIG. 6 is a schematic illustration of overviews and displays at the server when providing multi-language support in a CMP environment.

Referring now to FIG. 6, according to an embodiment of the present invention, the CMP server is capable of generating passwords by being in communication with the client PC OS. The server module can obtain the appropriate keyboard settings from the OS (e.g. language/locality). The Server module indicates the appropriate keyboard type to an administrator (e.g. in the Server Control Panel display). The CMP agent is then able to pass the appropriate passwords (either translated or with the appropriate table) to the client PC via an OS application.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent a applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
ascertaining user interface translation information; and
providing the information to an apparatus so as to be accessible during a pre-boot operating stage of the apparatus;
wherein the pre-boot operating stage of the apparatus comprises a stage during which the apparatus is operating under an operating environment prior to booting of an installed operating system.

2. The method according to claim 1 wherein the information comprises keyboard type information.

3. The method according to claim 2 further comprises:
receiving the keyboard type information at a server from an application running on the apparatus; and,
providing translation information to the apparatus.

4. The method according to claim 1 wherein the providing the information step occurs during manufacture of the apparatus.

5. The method according to claim 1 wherein the ascertaining step occurs after an operating system of the apparatus has booted at least one time.

6. The method according to claim 5 wherein the ascertaining step further comprises: providing the information to an application running in the operating system.

7. The method according to claim 6 wherein the application provides the information to a memory of the apparatus via a system management interrupt (SMI) call.

8. A system comprising:
an apparatus having:
a processor; and
a memory storing code accessible by the processor to:
ascertain translation information corresponding to a user interface of the apparatus; and
provide the information to the apparatus so as to be accessible during a pre-boot operating stage of the apparatus;
wherein the pre-boot operating stage of the apparatus comprises a stage during which the apparatus is operating under an operating environment prior to booting of an installed operating system.

9. The system according to claim 8 wherein the information comprises keyboard type information.

10. The system according to claim 8 wherein the ascertaining occurs after an operating system of the apparatus has booted at least one time.

11. The system according to claim 10 wherein the ascertaining further comprises: providing the information to an application running in the operating system.

12. The system according to claim 11 wherein the application provides the information to a memory of the apparatus via an SMI call.

13. A program storage device readable by machine, tangibly embodying a program of instructions executable by the machine to perform acts, said acts comprising:
ascertaining user interface translation information; and
providing the information to an apparatus so as to be accessible during a pre-boot operating stage of the apparatus;
wherein the pre-boot operating stage of the apparatus comprises a stage during which the apparatus is operating under an operating environment prior to booting of an installed operating system.

14. The program storage device according to claim 13 wherein the information comprises keyboard type information.

15. The program storage device according to claim 14 wherein said acts further comprise:
receiving the keyboard type information at a server from an application running on the apparatus; and,
providing translation information to the apparatus.

16. The program storage device according to claim 13 wherein the ascertaining step occurs after an operating system of the apparatus has booted at least one time.

17. The program storage device according to claim 16 wherein the ascertaining step further comprises: providing the information to an application running in the operating system.

18. The program storage device according to claim 17 wherein the application provides the information to a memory of the apparatus via an SMI call.

* * * * *